United States Patent [19]

Hargreaves et al.

[11] Patent Number: 4,725,452

[45] Date of Patent: * Feb. 16, 1988

[54] PRODUCTION OF INFRARED REFLECTING COATINGS ON GLASS

[75] Inventors: Edward Hargreaves, Prescot; Joseph E. Lewis, Ormskirk, both of England

[73] Assignee: Pilkington Brothers P.L.C., St. Helens, England

[*] Notice: The portion of the term of this patent subsequent to Apr. 22, 2003 has been disclaimed.

[21] Appl. No.: 839,715

[22] Filed: Mar. 14, 1986

[30] Foreign Application Priority Data

Mar. 22, 1985 [GB] United Kingdom ............... 8507457
Mar. 22, 1985 [GB] United Kingdom ............... 8507460

[51] Int. Cl.$^4$ ............................................. B05B 5/00
[52] U.S. Cl. ................................. 427/160; 65/60.51; 427/110; 427/168; 427/314; 427/427
[58] Field of Search ................. 427/255, 255.1, 255.3, 427/226, 314, 160, 168, 427; 65/60.51, 60.52

[56] References Cited

U.S. PATENT DOCUMENTS

| | | | |
|---|---|---|---|
| 3,107,177 | 10/1963 | Saunders et al. | 427/314 |
| 4,144,362 | 3/1979 | Larkin | 427/255 |
| 4,172,159 | 10/1979 | Marcault | 427/168 |
| 4,265,974 | 5/1981 | Gordon | 427/255 |
| 4,325,987 | 4/1982 | Kalbskopf | 427/110 |
| 4,349,370 | 9/1982 | Terneu | 427/168 |
| 4,500,567 | 2/1985 | Kato et al. | 427/255 |
| 4,584,208 | 4/1986 | Hargreaves et al. | 427/160 |
| 4,598,023 | 7/1986 | Van Laethem et al. | 427/314 |

FOREIGN PATENT DOCUMENTS

| | | | |
|---|---|---|---|
| 0039256 | 3/1981 | European Pat. Off. | 427/160 |
| 1119539 | 7/1968 | United Kingdom . | |
| 1565765 | 4/1980 | United Kingdom | 427/160 |

*Primary Examiner*—Sadie L. Childs
*Attorney, Agent, or Firm*—Burns, Doane, Swecker & Mathis

[57] ABSTRACT

Infra red reflecting fluorine-containing tin oxide coatings are applied to glass using a solid chlorine-containing volatile inorganic tin (IV) compound optionally containing fluorine. The inorganic tin (IV) compound is suspended in carrier gas. When that compound is fluorine free, the suspension is directed on to the hot glass surface in the presence of a separate source of fluorine which may be an organic tin compound. When the inorganic tin (IV) compound contains fluorine, the suspension is directed on to the hot glass surface in the presence of an organic tin compound which may contain fluorine. Examples of the inorganic tin (IV) compounds which may be used are ammonium hexahalostannates of the formula $(NH_4)_2SnHal_6$, wherein Hal represents halogen, being either chlorine, or a minor atomic proportion of fluorine and the balance chlorine.

23 Claims, No Drawings

4,725,452

PRODUCTION OF INFRARED REFLECTING COATINGS ON GLASS

BACKGROUND OF THE INVENTION

1. Field of the Invention.

The invention relates to a process for the production of infra red reflecting fluorine-containing tin oxide coatings on flat glass.

2. Description of the Prior Act.

It is known that fluorine-containing tin oxide coatings on flat glass of appropriate thickness, for example 100 nm to 1000 nm, reflect infra red radiation whilst transmitting light in the visible part of the spectrum. It is also known to make part of the spectrum. It is also known to make such coatings by spraying an aqueous solution of tin chloride containing fluorine in the form of hydrofluoric acid or an ammonium fluoride on to hot glass. More recently, it has been proposed, in UK Pat. No. 1,565,765, to overcome some of the practical problems encountered in operating a solution spray process by projecting an organic tin compound in the form of a finely divided powder suspended in a stream of carrier gas containing hydrogen fluoride onto the hot glass. A modified form of this process, which simplifies the problem of controlling the tin:fluorine ratio in the coating produced, is described in European patent application No. 39,256 A1; in this process, a powdered fluorine compound, dispersed in the carrier gas used for the organic tin compound, is used as a source of fluorine in place of the hydrogen fluoride gas. In a preferred form of the invention described in European patent application No. 39,256 A1, a single organic compound such as dibutyl tin difluoride is used as a source of both tin and fluorine.

The coatings produced in accordance with the teaching of European patent application No. 39,256 A1 have high infra red reflectivity and are generally colourless in appearance although, in common with other thin films, they give rise to interference colours in reflection. The interference colours depend on the thickness of the coating, so that variations in thickness across a coating lead to an observable variation in the interference colour seen. The visual impact of the interference colour, and the variations in such colour resulting from variations in thickness of the coating, are generally less the greater the mean coating thickness of the coating. However, it will be appreciated that, since the coatings absorb visible light, the light transmission of the coated glass is reduced as the thickness of the coating is increased.

We have proposed, in our copending UK patent application No. 2,156,386A, published after the priority date of this application, to increase the light transmission of the coatings of given thickness by using solid finely divided volatile inorganic tin (IV) compounds which contain both chlorine and fluorine in place of the organic tin compounds used in European patent application No. 39,256 A1.

SUMMARY OF THE INVENTION

We have now found that similar beneficial results may be obtained using the corresponding fluorine free volatile inorganic tin (IV) compounds containing chlorine with a separate source of fluorine. The best results, in terms of high infra red reflectivity, have been achieved using organic tin fluorine compounds as the source of fluorine; and we have further found that the use of organic tin compounds, preferably containing fluorine, in conjunction with the volatile inorganic tin (IV) compounds of (UK) patent application No. 2,156,386A which contain both chlorine and fluorine, results in an increase in the infra-red reflectivity over the coatings produced using such volatile tin (IV) compounds alone.

According to the present invention there is provided a process for applying an infra-red reflecting fluorine-containing tin oxide coating to glass which comprises directing on to a hot glass surface at a temperature of 400 to 750° C., in suspension in carrier gas, (i) a finely divided solid chlorine-containing volatile inorganic tin (IV) compound (as herein defined), optionally containing fluorine, (ii) when (i) is fluorine free, a separate source of fluorine, and (iii) when (i) contains fluorine, and organic tin compound.

By the expression "inorganic tin compound" is meant a compound free from carbon-tin bonds. The compounds used in the practice of the invention may, however, contain organic groups not directly bonded through a carbon atom to the tin. The chlorine is generally bonded directly to the tin.

In order to obtain a uniform coating, the tin compound should envole a tin containing vapour at or below the glass temperature. The expression "volatile" is used herein to refer to tin compounds that evolve a tin containing vapour at or below the glass temperature. Compounds which evolve a tin-containing vapour at or below 400° C. are preferred, and the best results have been obtained with compounds which are substantially completely volatilised on heating in air at 400° C.

DETAILED DESCRIPTION OF THE INVENTION

The preferred tin (IV) compounds for use in the practice of the present invention are hexahalostannates of formula $Y_2(Sn\ Hal_6)_n$ wherein Y is a cation which does not leave a solid residue when the hexachlorostannate decomposes on the hot glass, n is the valency of the cation, and Hal represents halogen, at least a proportion of the halogen present being chlorine.

Y is preferably an ammonium ion, which may be substituted or unsubstituted. The ammonium ion may be substituted with one or more organic groups, for example, alkyl or aryl groups. The chain length of the organic groups is not critical, although it is generally convenient to use organic groups containing up to eight carbon atoms.

The halogen present is preferably all chlorine, or a minor atomic proportion of fluroine and the balance chlorine. Typically, the fluorine-containing hexahalostannates contain an average of 0.1 to 2, preferably 0.5 to 1.5 fluorine atoms, to each tin atom. Compounds of this type are described in published UK patent application No. 2,156,386A and the corresponding allowed U.S. patent application Ser. No. 716,167; filed Mar. 26, 1985.

A preferred inorganic tin (IV) compound is ammonium hexachlorostannate of the formula $(NH_4)_{22}\ SnCl_2$.

In solid form, the chlorine-containing inorganic tin (IV) compounds may additionally contain water of crystallisation.

The hexahalostannate starting materials referred to above may be prepared by forming an aqueous solution from sources of the cation Y (preferably an ammonium ion, which may be substituted or unsubstituted), tin (IV) ions, chloride ions and fluoride ions if required in appropriate proportions and depositing a solid hexahalostannate; this may involve evaporating, under vacuum, to dryness. Preferably, stannic chloride is used as a source of tin (IV) ions and chloride ions, and ammonium halides, especially ammonium chloride and ammonium fluoride, are used as the sources of ammonium and halide ions.

Other chlorine containing volatile inorganic tin (IV) compounds (as herein defined) which may be used in the practice of the present invention are fluorine free or fluorine-containing adducts of the formula $L_2SnHal_4$ where L is a monodentate ligand and Hal represents halogen, the halogen present being either chlorine or a minor atomic proportion of fluorine and the balance chlorine. Examples of such ligands are dimethyl sulphoxide and benzyl cyanide. When the adducts contain fluorine a minor proportion of the halogen present in the adduct is preferably fluorine and the balance chlorine.

When the chlorine-containing tin (IV) compound used is fluorine free, a separate source of fluorine is used.

This source of fluorine may be a gaseous fluorine compound or a solid tin fluorine compound. However, good results have also been obtained using ammonium fluoride or ammonium bifluoride as the source of fluorine, especially when using chlorine-containing inorganic tin (IV) compounds which contain organic groups not bonded to the tin by a carbon-tin bond.

The preferred gaseous fluorine compound for use in the invention is hydrogen fluoride, which does not leave any undesired residues in the coating. When hydrogen fluoride is used, it is preferably incorporated in the carrier gas containing the chlorine-containing inorganic tin (IV) compound.

Preferred solid tin fluorine compounds for use as source of fluorine in the practice of the invention are organic tin compounds of general formula $$R_xSnF_y$$

where each R independently represents an alkyl group, preferably containing 1 to 4 carbon atoms, $x=1, 2$ or 3 and $x+y=4$. Examples of such solid tin fluorine compounds are dibutyl tin difluoride and tributyl tin fluoride.

When the chlorine-containing tin (IV) compound used contains fluorine, an organic tin compound may be used to increase the infra red reflectivity of the coating obtained. The expression "organic tin compound" is used herein to refer to compounds containing organic groups, whether or not they contain carbon-tin bonds.

Preferred organic tin compounds include the compounds of general formula $R_xSnF_y$ referred to above.

Other organotin compounds which have been found suitable for use in increasing the infra red reflectivity of the coating are tin compounds of the general formula $R_2SnO$ wherein each R independently represents an alkyl group, preferably containing 1 to 4 carbon atoms. An example of a tin compound of this type is dibutyltin oxide.

Monoalkyltin oxides, typically monobutyltin oxide and monooctyltin oxide, may also be used as the organotin compound.

A further class of compounds which has been found effective is the alkylstannoic acids, typically butylstannoic acid.

It is believed that the uniformity of the coating obtained in the coating process depends, in part, on the particle size of the finely divided solid materials used. It is preferred, therefore, to use the solid materials in finely divided form with a maximum particle size below 100 microns and preferably below 20 microns. If necessary the solid materials which are to be applied to the glass in the carrier gas should be ground to obtain the desired fine powder.

For application to the glass surface to be coated, the solid materials are suspended in carrier gases. Where two solid materials are used, they may be suspended in a single stream of carrier gas directed on to the glass, or they may be suspended in separate streams of carrier gas which are directed either together or sequentially onto the glass surface. The carrier gas used may conveniently be air (and preferably contains air or oxygen when an organic tin compound is present), but the oxygen required to form the tin oxide from the inorganic tin (IV) compound is preferably provided by water. This may be present either in the solid materials as water of crystallisation or absorbed water, or may be added to the carrier gas as water vapour.

The process of the present invention may be used to coat flat glass hot from the forming process, and is especially useful for coating float glass where it passes out of the float bath into the annealing lehr. At this position, the temperature of the glass will usually be in the range 550° C. to 650° C.

When using a chlorine-containing inorganic tin (IV) compound which is fluorine free, the proportion of fluorine incorporated in the tin oxide coating may be regulated by controlling the proportion of the fluorine free materials relative to fluorine-containing materials used as the source of fluorine. When using a chlorine-containing inorganic tin (IV) compound which contains fluorine, the proportion of fluorine incorporated in the tin oxide coating may be regulated by controlling the proportion of fluorine to chlorine in the compound, and the proportions in which the inorganic tin (IV) compound and the organic tin compound are used.

The inorganic tin (IV) compound, whether containing fluorine or fluorine free, will usually be used with a minor proportion by weight of the source of fluorine (for fluorine free inorganic tin (IV) compounds) or organic tin compound (for fluorine-containing inorganic tin (IV) compounds), although higher proportions of the fluorine source/organic tin compound may be used if desired, especially when making thinner coatings e.g. coatings less than 400 nm thick. Preferably the fluorine source/organic tin compound is used in an amount of 1% to 25% by weight, based on the weight of the inorganic tin (IV) compound.

The fluorine doped tin oxide coatings produced by the present invention have, in comparison with fluorine doped tin oxide coatings of the same thickness produced under the same conditions using the fine powder organic tin coating reactants proposed in the prior art, higher light transmission. Particularly high infra red reflectivities have been achieved using chlorine-containing inorganic tin (IV) compounds which contain fluorine in conjunction with organic tin compounds. In addition, because the hexahalostannates which are used in accordance with preferred embodiments of the invention are generally non-hygroscopic, they have the advantage of being more readily milled, handled and conveyed than more hygroscopic compounds referred to in the art.

The invention also includes glass having an infra red reflecting fluorine-containing tin oxide coating produced by a process in accordance with the invention.

The invention is illustrated but not limited by the following Examples. In the Examples, the values quoted for light transmission are for transmission of light from a C.I.E. Illuminant C Source. The values of emissivity quoted are those obtained by applying the formula:

$$\text{Emissivity, } E = \frac{\int_0^\infty e\lambda B(\lambda, T)d\lambda}{\int_0^\infty B(\lambda, T)d\lambda}$$

where
 $e\lambda$ = spectral emittance
and
 $B(\lambda,T)$ = black body spectral energy distribution at 300° K The emissivity, E, calculated as above, is related to the infra red reflectivity of the coating such that, in general, the lower the emissivity, the higher the infra red reflectivity.

EXAMPLE 1

Solid ammonium hexachlorostannate $(NH_4)_2SnCl_6$ and dibutyl tin difluoride (DBTDF) were each milled with 4% by weight of "Cab-o-Sil" (an amorphous silica available in commerce from Cabot Carbon Limited of Ellesmere Port, England) as a milling additive and flow promoter in a pin mill to a maximum particle size of less than 100 microns. The milled ammonium hexachlorostannate was then blended with 5% by weight, based on the weight of the hexachlorostannate, of the milled DBTDF, and a sample of the blend was suspended in a stream of hot air containing steam as carrier gas. The carrier gas stream was directed on to the surface of 6mm float glass at 670° C. at a rate of 3 grams per 100 square centimetres of glass. The coated glass produced was found to have a light transmission of 76.8%; the coating was 600nm thick. The emissivity of the coated glass was found to be 0.39, indicating a high infra red reflectivity.

EXAMPLE 2

DBTDF was milled in a pin mill with 2% by weight of "Cab-o-Sil" to a maximum particle size of 100 microns, and ammonium hexachlorostannate $(NH_4)_2SnCl_6$ was milled in a jet mill with 4% by weight of "Cab-o-Sil" to a maximum particle size of 30 microns.

The DBTDF and ammonium hexachlorostannate were then suspended in separate streams of air and directed sequentially through slots 0.25 m long and 0.006 m wide, angled at 20° to the horizontal in the direction of advance of the glass, onto the surface of 6 mm float glass advanced horizontally beneath the slots at 5 m per minute. The temperature of the glass was 600° C. The slots were spaced 0.1 m apart on the direction of advance of the glass, and the vapours from the glass were confined downstream of the slots by a shroud 0.25 m wide and 0.75 m long, arranged 0.016 m above the glass and parallel to the glass surface. 30 grams per minute of the milled DBTDF was suspended in a stream of 0.33 m³ per minute of air at ambient pressure and temperature and directed on to the glass through the upstream slot. 150 grams per minute of the milled ammonium hexachlorostannate was suspended in a stream of 0.58 m³ per minute of air at ambient pressure and temperature, mixed with a stream of 0.66 m³ per minute of air at ambient pressure and 340° C. and 0.25 Kg per mniute steam, and directed on to the glass through the downstream slot.

The coated glass was found to have a light transmission of 79.0%; the coating was 700 nm thick. The emissivity of the coated glass was found to be 0.19, indicating a high infra red reflectivity.

EXAMPLE 3

Example 2 was repeated using 10 grams per minute of milled DBTDF at the upstream slot and 150 grams per minute of milled ammonium hexachlorostannate at the downstream slot. The gas flow rates were unchanged.

The coated glass was found to have a light transmission of 73.0% and an emissivity of 0.18. The coating was 670 nm thick.

EXAMPLE 4

Solid ammonium hexachlorostannate milled as described in Example 1 was mixed with 10% by weight (based on the weight of the hexachlorostannate) of ammonium bifluoride, $NH_4HF_2$, and the mixture milled in a centrifugal mill to a maximum particle size of less than 100 microns. A sample of the milled mixture was suspended in a stream of hot air containing steam as carrier gas and the carrier gas stream directed on to the surface of 6 mm float glass at 620° C. at a rate of 5 grams per 100 square centimetres of glass. The coated glass produced was found to have a light transmission of 80.9%; the coating was 550nm thick. The emissivity of the coated glass was found to be 0.49, indicating a high infra red reflectivity.

EXAMPLE 5

83.5 grams of $(CH_3)_3CNH_3$ was dissolved in 40 mls of $H_2O$ and 101 mls of 36% HCl were added. The resulting solution was slowly added to a solution of 200 grams of $SnCl_4.5H_2O$ in 40 mls of water with stirring. The solution was left overnight and a crop of white crystals deposited. The crystals were separated by filtration and allowed to dry under ambient conditions.

The resulting solid $](CH_3)_3 CNH_3)_2 ] SnCl_6$ was milled with 4% by weight of "Cab-o-Sil" in a centrifugal mill to a maximum particle size of less than 100 microns. A portion of the milled solid was mixed with 20% by weight of $NH_4F$ and the mixture milled in a centrifugal mill to a maximum particle size of less than 100 microns. A sample of the milled mixture was suspended in a stream of hot air containing steam as carrier gas, and the carrier gas steam directed on to the surface of 6mm float glass at 670° C. at a rate of 2.9 grams per 100 square centimetres of glass. The coated glass produced was found to have a light transmission of 75.8%; the coating was 550nm thick. The emissivity of the coated glass was found to be 0.21, indicating a high infra red reflectivity.

EXAMPLE 6

A further portion of the milled solid $[(CH_3)_3CNH_3)_2 ] SnCl_6$ produced in Example 5 was mixed with 5% by weight, based on the weight of the hexachlorostannate, of DBTDF milled as described in Example 1. A sample of the mixture was suspended in a stream of hot air containing steam as carrier gas and the carrier gas stream directed on to the surface of 6 mm float glass at 670° C. at a rate of 3 grams per 100 square centimetres of glass. The coated glass produced was found to have a light transmission of 79.0%; the coating was 600 nm thick. The emissivity of the coated glass was found to be 0.34, indicating a high infra red reflectivity.

EXAMPLE 7

1% by weight of dibutyl tin oxide was mixed with 100% by weight of $(NH_4)_2SnCl_4F_2$ and 4% by weight of "Cab-o-Sil" and the mixture milled in a pin mill to a maximum particle size of 100 microns. 300 grams per minute of the milled powder was suspended in a stream of 1.5m$^3$ per minute of hot air, containing 0.75 Kg per minute of steam, as a carrier gas. The carrier gas containing the powder was directed through a slot 0.5 m long and 0.01 m wide onto 6 mm float glass at a temperature of 600° C. advanced past the slot at 5 m per minute. The fluorine-containing tin oxide coating produced on the glass had a thickness of 700 nm. The light transmission of the coated glass was 76.2%, while the emissivity of the coated glass was found to be 0.17, indicating a high infra red reflectivity.

EXAMPLES 8-15

Example 7 was repeated but using the finely divided coating materials shown in Table 1 in the proportions indicated to produce fluorine-containing tin oxide coatings on the glass. The amounts used and conditions were as indicated in Example 7, except that in Examples 9 to 12, the milled powder mixture was used at an increased rate of 400 grams per minute. The thickness of the resultant coating and the emissivity and percentage light transmission of the coated glasses are as shown in Table 1.

Each of the samples gave a very low emissivity corresponding to a high reflectivity to infra-red light.

EXAMPLE 16

16.8% by weight monobutyl tin oxide (supplied by Schering Chemical Co. Ltd., Burgess Hill, Sussex, England, as a mixture of $C_4H_9.SnOOH$ and $(C_4H_9SnO)_2O$ and 100% by weight $(NH_4)_2SnCl_4F_2$ were mixed with 4% by weight of Cab-o-Sil, and the mixture milled in a centrifugal mill to a maximum particle size of 100 microns. A sample of the milled mixture was suspended in a stream of hot air containing steam as carrier gas and the carrier gas stream directed on to the surface of 6 mm float glass at 620° C. at a rate of 7.8 grams per 100 square centimetres of glass.

The coated glass produced was found to have a light transmission of 72.9% and an emissivity of 0.20, indicating a high infra red reflectivity. The coating was found to be 700 nm thick.

EXAMPLE 17

Example 16 was repeated using butyl stannoic acid in place of the monobutyl tin oxide. The coated glass produced was found to have a light transmission of 73.3% and an emissivity of 0.20, indicating a high infra red reflectivity. The coating was found to be 700 nm thick.

COMPARATIVE EXAMPLE

Example 7 was repeated but using $(NH_4)_2SnCl_4F_2$ alone without the addition of an organic tin compound in accordance with the present invention to produce a fluorine-containing tin oxide coating having a thickness of 800 nm. The light transmission of the coated glass was 74.8%, while the emissivity of the coated glass was found to be 0.291, thus exhibiting a lower reflectivity to infra red light than glass coated using an inorganic tin (IV) compound containing both chlorine and fluorine in conjunction with an organic tin compound.

EXAMPLE 18

277 grams of benzyl cyanide $C_6H_5.CH_2CN$ was added slowly with stirring to a solution of 277 grams of tin tetrachloride in 550 grams of methylene chloride. The solution was left overnight and a crop of white crystals deposited. The crystals were separated by filtration and allowed to dry under ambient conditions.

The resulting solid $SnCl_4.2C_6H_5CH_2CN$ was milled with 4% by weight of "Cab-o-Sil" in a centrifugal mill to a maximum particle size of less than 100 microns. A portion of the milled solid was mixed with 10% by weight of $NH_4F$ and the mixture milled in a centrifugal mill to a maximum particle size of less than 100 microns. A sample of the milled mixture was suspended in a stream of hot air as carrier gas, and the carrier gas stream directed on to the surface of 6 mm float glass at 670° C. at a rate of 3 grams per 100 square centimetres of glass. The coated glass produced was found to have a light transmission of 78.1% and an emissivity of 0.24, indicating a high reflectivity. The coating was found to be 425 nm thick.

EXAMPLE 19

Separate samples of dibutyl tin oxide (DBTO) and $(NH_4)_2SnCl_5F$ were each milled in a jet mill with 4% by weight of "Cab-o-Sil" to a maximum particle size of 30 microns.

TABLE 1

| Example | Coating Material | Thickness (nm) | Emissivity | Light Transmission (%) |
|---|---|---|---|---|
| 8 | $(NH_4)_2SnCl_4F_2$ + 1% DBTO | 800 | 0.193 | 72.5 |
| 9 | $(NH_4)_2SnCl_{5.6}F_{0.4}$ + 1% MOTO | 550 | 0.193 | 74.3 |
| 10 | $(NH_4)_2SnCl_{5.6}F_{0.4}$ + 1% MOTO | 700 | 0.182 | 73.8 |
| 11 | $(NH_4)_2SnCl_4F_2$ + 1% DBTDF | 700 | 0.148 | 75.1 |
| 12 | $(NH_4)_2SnCl_4F_2$ + 1% DBTDF | 680 | 0.156 | 77.2 |
| 13 | $(NH_4)_2SnCl_4F_2$ + 2.5% DBTO | 700 | 0.168 | 72.1 |
| 14 | $(NH_4)_2SnCl_4F_2$ + 2.5% DBTO | 750 | 0.172 | 72.5 |
| 15 | $(NH_4)_2SnCl_5F$ + 3% TBTF | 700 | 0.250 | 78.8 |

KEY:
DBTO — dibutyl tin oxide
DBTDF — dibutyl tin difluoride
MOTO — monooctyl tin oxide (supplied by Schering Chemical Co. Ltd., Burgess Hill, Sussex, England as mixture of $C_8H_{17}.SnOOH$ and $(C_8H_{17}SnO)_2O$
TBTF — tributyl tin fluoride The DBTO and ammonium hexahalostannate were then suspended in separate streams of air and directed sequentially through upstream and downstream slots 0.5 m long onto the surface of 6 mm float glass advanced horizontally beneath the slots at 5 m per minute. The temperature of the glass was 600° C.

The slots were spaced 0.1 m apart in the direction of advance of the glass. The upstream slot was 0.006 m wide, angled at 20° to the horizontal in the direction of advance of the glass. The downstream slot was 0.010 m wide, angled at 45° to the horizontal in the direction of advance of the glass. The vapours from the glass were confined downstream of the slots by a shroud 0.5 m wide and 0.4 m long, arranged 0.016 m above the glass and parallel to the glass surface. 60 grams per minute of the milled DBTO was suspended in a stream of 0.55 m$^3$ per minute of air at ambient temperature and pressure, mixed with a stream of 0.67 m$^3$ per minute of air at ambient pressure and temperature and directed on to the glass through the upstream slot.

400 grams per minute of the milled hexahalostannate was suspended in a stream of 0.87 m$^3$ per minute of air at ambient pressure and temperature, mixed with a stream of 0.77 m$^3$ per minute of air at ambient pressure and 350° C. and 760 grams per minute of steam, and directed on to the glass through the downstream slot.

The coated glass was found to have a light transmission of 74.1%; the coating was 800 nm thick. The emissivity of the glass was found to be 0.17, indicating a high infra red reflectivity.

EXAMPLE 20

Example 19 was repeated using 20 grams per minute of milled DBTO at the upstream slot. All the remaining flow rates remain unchanged. The coated glass was found to have a light transmission of 75.3%, the coating was 675 nm thick. The emissivity of the glass was found to be 0.21. Similar beneficial results were achieved using DBTDF in place of the DBTO.

We claim:

1. A process for applying an infra-red reflecting fluorine-containing tin oxide coating to glass comprising directing on to a hot glass surface at a temperature of 400° to 750° C., in suspension in carrier gas, a finely divided inorganic solid tin (IV) compound free from carbon-tin bonds which contains chlorine and optionally fluorine and evolves a tin-containing vapor at or below the glass temperature and wherein:
   (a) when said inorganic solid tin (IV) compound is fluorine free, the suspension is directed on to the hot glass surface in the presence of a separate source of fluorine which may be an organic tin compound; and
   (b) when said inorganic solid tin (IV) compound contains fluorine, the suspension is directed on to the hot glass surface in the presence of an organic tin compound which may contain fluorine.

2. A process according to claim 1 wherein the said tin (IV) compound used is a hexahalostannate of formula Y$_2$(SnHal$_6$)$_n$ wherein
   Y is a cation which does not leave a solid residue when the hexahalostannate decomposes on the hot glass,
   n is the valency of the cation, and
   Hal represents halogen, the halogen present being either chlorine, or a minor atomic proportion of fluorine and the balance chlorine.

3. A process according to claim 2 wherein Y is an ammonium ion.

4. A process according to claim 2 wherein Y is an ammonium ion substituted with at least one organic group.

5. A process according to claim 3 characterised in that the said tin (IV) compound used is an ammonium hexahalostannate of the formula
   wherein x has an average value of 0.1 to 2.

6. A process according to claim 1 wherein the said tin (IV) compound used is an adduct of the formula L$_2$SnHal$_4$ wherein Hal represents halogen, the halogen present being either chlorine, or a minor atomic proportion of fluorine and the balance chlorine, and L is a monodentate ligand.

7. A process according to claim 1 wherein said organic tin compound used in case (a) or (b) is a compound of the general formula $$R_xSn\,F_y$$ 

wherein each R independently represents an alkyl group, x is 1, 2 or 3, and x+y=4.

8. A process according to claim 7 wherein said organic tin compound used in case (a) or (b) is dibutyltin difluoride.

9. A process according to claim 1 wherein the said tin (IV) compound contains fluorine and the organic tin compound which may contain fluorine is a fluorine free compound of the general formula R$_2$SnO wherein each R independently represents an alkyl group.

10. A process according to claim 9 wherein said organic tin compound is dibutyltin oxide.

11. A process according to claim 1 wherein the said tin (IV) compound contains fluorine and the organic tin compound which may contain fluorine is a monoalkyl tin oxide.

12. A process according to claim 11 wherein the monoalkyl tin oxide is monobutyl tin oxide.

13. A process according to claim 1 wherein the said tin (IV) compound contains fluorine and the organic tin compound which may contain fluorine is an alkylstannoic acid.

14. A process according to claim 13 wherein the alkylstannoic acid is butylstannoic acid.

15. A process according to claim 1 wherein the said tin (IV) compound is fluorine-free and ammonium flouride or ammonium bifluoride is used as the source of fluorine.

16. A process according claim 1 wherein the carrier gas for the said tin (IV) compound contains water vapour.

17. A process according to claim 1 wherein the said tin (IV) compound used is in finely divided form with a maximum particle size below 100 microns.

18. A process according to claim 1 wherein the said tin (IV) compound used is a hexahalostannate of formula Y$_2$(SnHal$_6$)$_n$ wherein
   Y is a cation which does not leave a solid reside when the hexahalostannate decomposes on the hot glass,
   n is the valency of the cation, and
   Hal represents halogen, the halogen present being either chlorine, or a minor atomic proportion of fluorine and the balance chlorine, and
wherein said (tin (IV) compound is used in conjunction with an organotin) organic tin compound used in case (a) or (b) is a compound of the general formula $$R_xSn\,F_y$$ 

wherein each R independently represents an alkyl group, x is 1, 2 or 3, and x+y=4.

19. A process according to claim 18 wherein the said tin (IV) compound used in an ammonium hexahalstannate of the formula $(NH_4)_2SnCl_{6-x}F_x$ wherein x has an average value of 0.1 to 2.

20. A process according to claim 19 wherein said organic tin compound used in case (a) or (b) is dibutyltin difluoride.

21. A process according to claim 1 wherein the said tin (IV) compound used contains fluorine and is a hexahalostannate of formula $Y_2(SnHal_6)_n$ wherein Y is a cation which does not leave a solid residue when the hexahalostannate decomposes on the hot glass, n is the valency of the cation, and Hal represent halogen, a minor atomic proportion of the halogen present being fluorine and the balance chlorine, and wherein said organic tin compound is an organic tin compound of the general formula $R_2SnO$ wherein each R independently represents an alkyl group.

22. A process according to claim 21 wherein the said tin (IV) compound used is an ammonium hexahalstannate of the formula $(NH_4)_2SnCl_{6-x}F_x$ wherein x has an average value of 0.1 to 2.

23. A process according to claim 22 wherein the organic tin compound is dibutyl tin oxide.

* * * * *